(Model.)
D. W. CURTIS.
REFRIGERATOR TANK.
No. 329,626. Patented Nov. 3, 1885.
2 Sheets—Sheet 1.
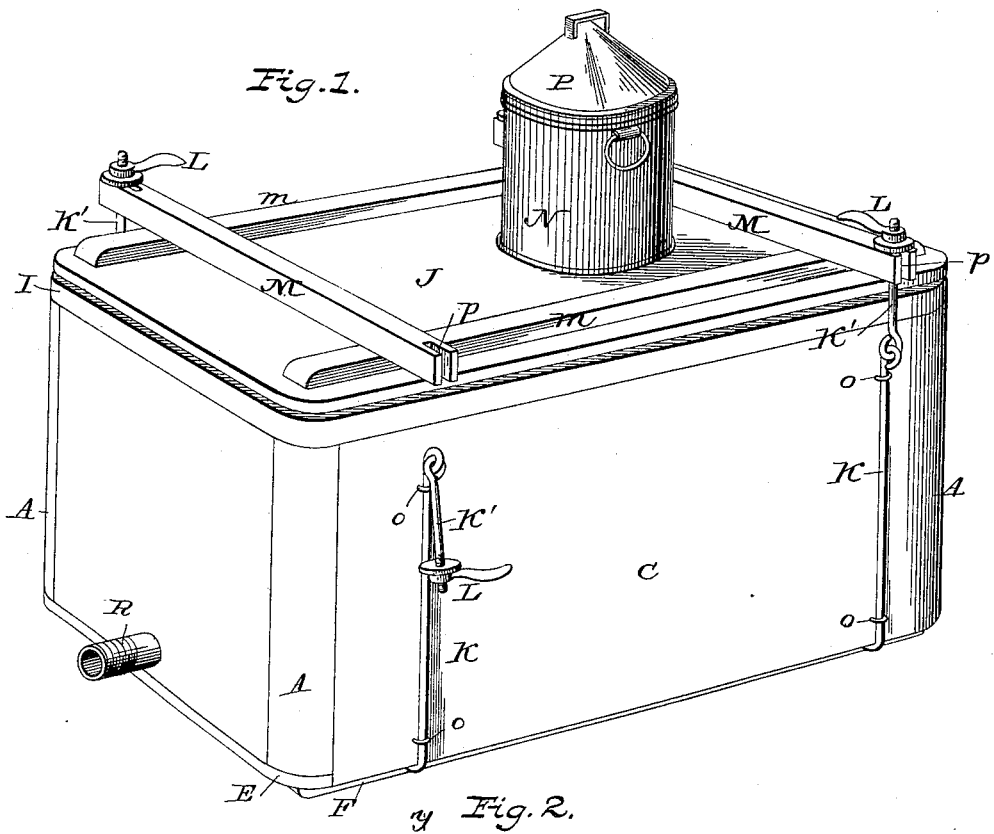
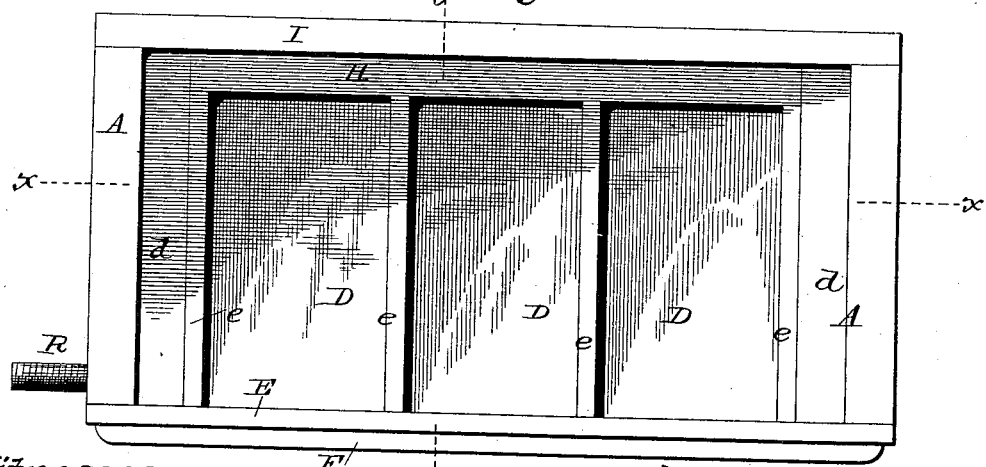
Witnesses:
Jas. F. DeHamis
Walter S. Dodge
Inventor:
David W. Curtis,
by Dodge & Son,
his Attys.

(Model.)
2 Sheets—Sheet 2.
D. W. CURTIS.
REFRIGERATOR TANK.
No. 329,626. Patented Nov. 3, 1885.
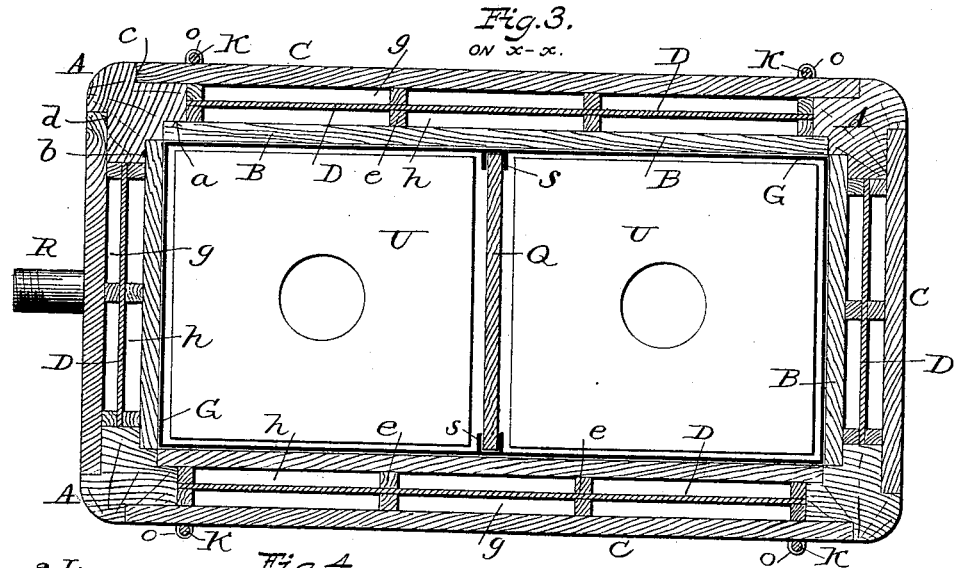
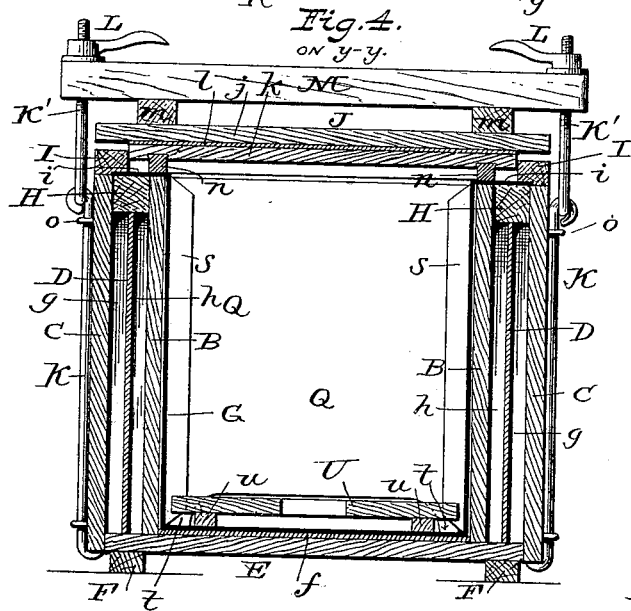
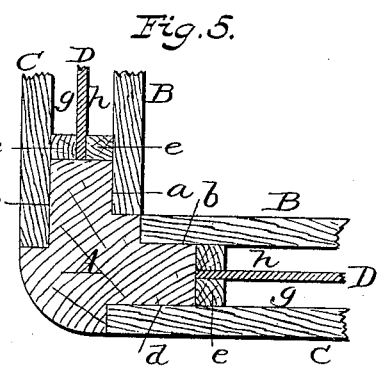
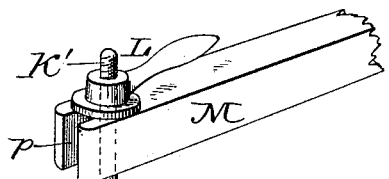
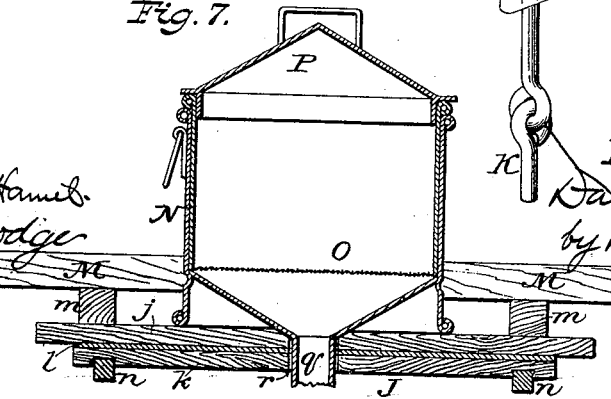
Witnesses:
Jas. F. Duhamel
Walter L. Dodge
Inventor:
David W. Curtis,
by Dodger Son,
his Attys.
N. PETERS, Photo-Lithographer, Washington, D. C.

UNITED STATES PATENT OFFICE.

DAVID W. CURTIS, FORT ATKINSON, WISCONSIN, ASSIGNOR OF TWO-THIRDS TO OSCAR S. CORNISH AND WALTER S. GREENE, BOTH OF SAME PLACE.

REFRIGERATOR-TANK.

SPECIFICATION forming part of Letters Patent No. 329,626, dated November 3, 1885.

Application filed July 21, 1885. Serial No. 172,238. (Model.)

*To all whom it may concern:*

Be it known that I, DAVID W. CURTIS, of Fort Atkinson, in the county of Jefferson and State of Wisconsin, have invented certain new and useful Improvements in Refrigerator-Tanks, of which the following is a specification.

My invention relates to refrigerator tanks or vessels for containing milk, cream, &c.; and it consists in various features and details hereinafter pointed out and claimed.

The purposes of the invention are to produce a tank or vessel in which matter may be kept at a uniform temperature regardless of the weather or the external temperature; to increase the strength, simplify the construction, and improve the appearance of the tank or vessel; to prevent the churning of milk or cream in the tank or vessel during transportation; to exclude the air, and to insure proper draining of the tank or vessel in emptying.

The drawings annexed clearly illustrate my invention.

Figure 1 is a perspective view of the improved refrigerator tank or vessel; Fig. 2, a side elevation of the same with the outside sheathing removed; Fig. 3, a horizontal section on the line $xx$ of Fig. 2; Fig. 4, a vertical transverse section on the line $yy$ of Fig. 2; Fig. 5, an enlarged view of one of the corners; Fig. 6, a perspective view of one of the fastenings for the cover; Fig. 7, a sectional view of the strainer-funnel through which milk or cream is introduced into the tank or vessel.

Although chiefly designed for milk and cream, this tank or vessel is admirably adapted for use as a refrigerator for liquids and solids of all kinds, and for that reason is described as a refrigerator rather than merely a milk or cream tank, the main features of construction being applicable to refrigerators generally. The body of the refrigerator is preferably of rectangular form with hollow walls containing double air-spaces. Such a body or box is formed of corner-pieces A, of the peculiar form shown in Figs. 3 and 5, inner boarding or sheathing, B, outer boarding or sheathing, C, and intermediate partitions, D, advisably of paper or straw-board, which may be varnished, oiled, or otherwise coated to render it non-absorbent or water-proof. Each corner-piece A consists of a post or block having two inner and two outer faces at right angles to each other, the inner faces being cut away to form longitudinal seats $a\ b$ for the ends of the inner boards or sheathing, B, and the outer faces being similarly cut away to form longitudinal seats $c\ d$ for the ends of the outer boards or sheathing, C. The seats $a$ and $b$ meet at the inner angle of the corner-piece A, as shown in Figs. 3 and 5, and, consequently, when sheathing is applied of a thickness just equal to the depth of said seats, the inner ends of the side and end boards of the inner sheathing meet, as shown in said figures, and form a close joint, and a sharp, well-defined angle or corner. The outer angle of the corner piece or post is cut away, preferably, to produce a rounded surface, as shown, thus making the corner a little lighter, and improving its appearance, and greatly lessening the danger of its being chipped or injured. The outer sheathing is likewise made of a thickness just equal to the depth of the seats $c\ d$, and consequently presents a surface flush with the corner-pieces A when secured thereto. Between the inner and outer sheathing I place a partition, D, advisably of paper or straw-board, because of the readiness with which such material can be cut, fitted, and applied, its non-conducting quality, and its cheapness. This partition, which extends from corner-post to corner-post entirely around the box, may be put in place after either or both the inner and outer sheathings are applied, and is held and supported equidistant between the two sheathings by strips $e$, of wood or other suitable material, tacked, cemented, or otherwise secured to the faces of the partitions. If applied after the inner and outer sheathings are secured to the corner-posts, the partition D will have the strips $e$ secured to its faces, and said strips will be pressed down to place between the sheathings; but if applied before the second sheathing one set of strips $e$ will be tacked or made fast to the first sheathing, the partition D secured to said strips, the strips then applied to the other face of the partition, and, lastly, the second sheathing applied, it being immaterial whether the inner or outer sheathing be applied first. The bottom E may be made of single or double thickness, as desired, but under ordinary circumstances I find it sufficient to make it of a single thickness of wood, covering its inner face, however, with a layer, $f$, of straw-board, as shown in Fig. 4. The under side of the bottom E is strengthened by longitudinal cleats or strips F, which prevent warping, and serve to raise the bottom off the ground, thereby preventing absorption of moisture or transmission of heat or cold from the ground. The bottom is secured to the corner-posts A, and is advisably joined to the side and end sheathing by nails or screws.

To adapt the box or vessel to contain milk, cream, or other liquids, or to prevent the walls from absorbing moisture from matter placed within it, I line the box with tin, or with zinc, sheet-iron, or other sheet metal, though tin is preferred. The lining G is made in the form of a box and of a size to fit accurately within and to closely fill the outer box or body, in order that it may rest upon and be supported by the inner walls of the latter at all points, and thus be prevented from bulging, sagging, or otherwise losing shape. By the interposition of the partion D, I form two dead-air spaces, $g$ and $h$, in both side and end walls of the box or body, the confined air in which spaces effectually prevents the passage of heat or cold through the walls of the box, in which office the straw-board or paper, by reason of its non-conducting quality, plays an important part.

To close the spaces $g$ $h$ at the top, I employ wooden strips H, which fit between the sheathings B C, rest upon the strips $e$, and extend from the upper edge of the partition D up to the top of the sheathings B C, the partition stopping below the sheathings, as shown in Figs. 2 and 4. To more effectually close said spaces, and particularly to effectually exclude moisture therefrom, I form the lining G with an outwardly-projecting flange or edge, $i$, all around, of a width sufficient to extend across the spaces $g$ $h$ and to rest upon the outer sheathing, C, where it is secured by a wooden strip, I, extending entirely around the box or body. This strip I serves also to retain the cover J against displacement horizontally, said cover being made to fit closely within the strip, as shown in Fig. 4. The cover is formed with two thicknesses of wood, $j$ and $k$, between which is secured a layer, $l$, of straw-board or paper, the two layers of wood being arranged with their grain crossing. To further guard against warping of the cover, I apply longitudinal cleats $m$ thereto, as shown in Figs. 1 and 4, crossing the grain of the upper layer of the cover.

For the purpose of securing a tight joint between the cover and body of the box, I secure to the under side of the cover a cork packing-strip, $n$, which is so located as to come directly over the edge of the inner sheathing, B, where the lining G is firmly supported, and where, consequently, a firm bearing for the packing-strip is secured, thus insuring a tight joint when the cover is pressed down firmly to place. This packing-strip is seated in a groove in the under side of the cover, the groove being made a little smaller than the width of the cork and the latter compressed therein. To thus press down the cover, and to retain it firmly in place, I provide a series of jointed rods, K K', each having its lower end bent laterally, and extended beneath the side or bottom of the box, as shown in Fig. 4, the rods being secured to the sides of the box by staples $o$ at a point below their joints. The upper section, K', of each rod is threaded and furnished with a washer and a nut, L, having a lateral arm or hand-piece, by which it may be turned up or down, as required.

M M indicate cross-bars secured to the upper side of cover J, and projecting over the sides thereof, the overhanging ends being formed with slots $p$, to receive the upper sections, K', of the fastening-rods K. Under this arrangement it is only necessary, in order to secure the cover, to swing up the sections K of the rods into the slots $p$, placing the washers and the nuts L above the cross-bars M, and then to screw down the nuts until the packing $n$ is properly compressed and the cover brought to place. It is desirable, of course, to keep the refrigerator box or tank closed at all times after anything is placed therein, and this is especially the case when the tank contains cream or milk, since variations of temperature and exposure to the air impair their butter-producing qualities. I therefore provide an inlet for cream or milk in the top or cover, but of such small size as to produce little or no effect upon the condition of the interior of the refrigerator. With this inlet I combine a funnel to enable the cream or milk to be readily poured into the tank through the small inlet, and, to avoid unnecessary handling of the milk and repeated exposures to the air, I provide the funnel with a strainer, so that the unstrained milk or cream may be strained in the act of pouring it into the tank. This construction and arrangement may be seen in Fig. 7, in which N indicates a metallic vessel of cylindrical form having its bottom made in the form of an inverted cone, so as to deliver the contents of the vessel through a central tubular neck or outlet, $q$, inserted into and passing through an inlet hole or opening, $r$, formed in the cover J. Within the vessel N, which forms a funnel, is placed a strainer, O, also having a cylindrical body, which body extends slightly above the top of vessel N, to permit its ready withdrawal therefrom for the purpose of cleaning both vessels and the straining material. A cover, P, closes the vessels N O and excludes the air, except during the filling of said vessels, at which time the liquid practically excludes the air.

In the practical use of tanks and vessels for the transportation of milk and cream it is found that if the vessel is of considerable size the milk or cream is churned to a considerable extent during transportation. To prevent this, I divide the tank by one or more vertical partitions, Q, into smaller chambers or sections, said partitions being readily removable for purposes of cleansing, or to give an unobstructed large chamber. To permit such removal, I provide the lining G with inwardly-projecting ribs or flanges s, between which to slide the partitions, as seen in Figs. 3 and 4. If extended to the bottom of the lining G from side to side, the partition or partitions Q would prevent or interfere with proper draining or emptying of the tank; hence I cut away the lower edge of each partition, leaving only small feet or supports t, one or more, which serve to support the partitions, but leave space beneath them for the milk or cream to pass from one chamber to another; and, finally, to an outlet-tube, R, passing through the wall of the box or body to the exterior, where it is threaded to receive a cock or faucet.

It is the usual practice, in order to prevent the splashing and churning of milk or cream in tanks used for transportation, to place therein a wooden float, which consists simply of a flat piece of board; but where such floats are employed they fall to the bottom of the vessel as the milk or cream is drawn off and prevent the proper drainage of the vessel. To prevent this, I provide the under side of each float, U, with feet or ribs u, which serve to hold them up off the bottom of the vessel and to insure proper drainage.

When the tank is filled or supplied with the desired quantity of cream or milk, the funnel N is removed and the inlet-opening r of the cover J plugged or corked, thus rendering the structure both air and water tight.

I am of course aware that hollow-walled structures have long been used for maintaining a given temperature within; and I am likewise aware that paper, straw-board, and like materials have been used in the construction of such chambers, and that a combined funnel and strainer is not broadly new. These features are, therefore, not broadly claimed; but the specific construction, combinations, and arrangement of parts are believed to be new and peculiarly advantageous, and are accordingly claimed.

Having thus described my invention, what I claim is—

1. The herein-described refrigerator box or body, consisting of corner-pieces A, having seats a b and c d, inner sheathing, B, and outer sheathing, C, secured to said corner-pieces, and a suitable bottom.

2. The box or body consisting of corner pieces A, having inner seats, a b, and outer seats, c d, inner sheathing, B, and outer sheathing, C, applied to the corner-pieces and made flush therewith, as shown, and partitions D, extending from each corner-post to the next intermediate between the sheathings B C.

3. In combination with corner-pieces A, inner sheathing, B, outer sheathing, C, and intermediate partitions, D, strips e, applied to opposite faces of said partitions and serving to retain the same in position.

4. In combination with corner pieces A, sheathings B C, and partition D, strips H, placed above said partition and filling the space between the two sheathings.

5. In combination with corner-pieces A, inner sheathing, B, outer sheathing, C, intermediate partition, D, and a suitable bottom, sheet-metal lining G, closely fitting the interior of the box or chest thus formed, and provided with outwardly-turned flanges i, extending to and resting upon the outer sheathing.

6. The combination of corner-pieces A, sheathings B C, intermediate partition, D, bottom E, lining G, having outwardly-turned flanges i, extending to and resting upon the outer sheathing, C, and strip I, secured upon said flanges.

7. The herein-described refrigerator chest, consisting of corner pieces A, sheathings B C, intermediate partition, D, bottom E, lining G, cover J, provided with slotted cleats M, and jointed rods K K', secured to the chest and provided with nuts L.

8. In combination with a refrigerator chest or box constructed substantially as described, a cover, J, composed of two layers of wood with an intermediate layer of straw-board or paper.

9. In combination with a refrigerator-chest, a cover consisting of wooden layers j k and intermediate paper or straw-board layer, l, longitudinal strips m, and packing-strip n.

10. In combination with chest A B C E, lining G, cover J, and fastening devices therefor, a combined funnel and strainer applied to said cover and communicating with the interior of the chest, substantially as and for the purpose explained.

11. In combination with a portable refrigerator-tank, a charging-funnel, N, provided with a removable strainer, O, substantially as shown and described.

12. In a portable refrigerator tank or vessel, an upright removable partition, substantially as shown.

13. In a portable refrigerator-tank, a sheet-metal lining provided with an outlet-tube, and with a removable upright partition having its lower edge raised above the bottom of the lining, whereby the contents of the tank are permitted to drain off.

14. In combination with a portable refrigerator-tank having an outlet at or near the bottom, a float provided with feet on its under side, whereby it is held up from the bottom of the tank to permit the free drainage thereof.

15. In combination with a refrigerator-tank, a float placed therein and supports to arrest the float before it reaches the bottom of the tank.

16. In combination with a portable refrigerator-tank, a charging-funnel, N, substantially as shown and described.

DAVID W. CURTIS.

Witnesses:
O. B. CORNISH,
L. GOSSELIN.